UNITED STATES PATENT OFFICE.

JOHN WILSON, OF NEW YORK, N. Y.

METHOD OF PURIFYING WATER.

SPECIFICATION forming part of Letters Patent No. 629,409, dated July 25, 1899.

Application filed November 28, 1898. Serial No. 697,689. (No specimens.)

*To all whom it may concern:*

Be it known that I, JOHN WILSON, a citizen of the United States, residing in the borough of Brooklyn, county of Kings, city and State of New York, have invented a new and useful Method of Purifying Water, of which the following is a specification.

The object of my invention is to render water potable or to increase its potability and also to purify it for other purposes—as, for instance, for laundry use or employment in steam-generators.

In carrying out my improvement I take the water whether under atmospheric pressure, pneumatic pressure, hydraulic pressure, or any other pressure and add thereto an aqueous solution of sodic chloride, alumina, and sulphate of alumina. This I use in proportions suitable to the character of the water to be purified, and hence it is impossible to give definite proportions. For example, I would suggest that for water having twenty grains of impurities to the gallon I may successfully use one grain of sodic chloride, one grain of alumina, and one-fourth grain of sulphate of alumina. After this treatment the water must be freed from impurities by settling, decantation, or filtration by means of any desirable apparatus.

Water containing impurities different in amount from the example given may be treated by taking a portion of such water in a graduated test-tube, adding sodic chloride, alumina, and sulphate of alumina in the proportions above given, and if that amount be insufficient to precipitate adding the same number of grains of each and proceeding in that manner until a precipitate is formed. Additions of sodic chloride, alumina, and sulphate of alumina will be made until the precipitation shall have ceased. This process will be pursued with such rapidity that the results will not be dependent upon the settling of such impurities as may separate by gravitation. Thus I shall obtain the proper amount of sodic chloride, alumina, and sulphate of alumina for the impurities. Having thus determined the proportion necessary for the treatment of any water, I employ that proportion.

The method of treating the water is to add the sodic chloride, which will principally unite with any argillaceous matter and form chlorid of alumina, which precipitates quickly. The sulphate of alumina, which is also a quick precipitant, acts to unite more particularly with the vegetable matter in the water, although it also acts to precipitate the argillaceous matter. The alumina is to take up any acid or to neutralize any corrosive effect of any acid or acids that may be in the water.

Wherever I use in my specification and claim the terms "alumina" and "sulphate of alumina" they are to be understood as not meaning any of the alums.

The sodic chloride, alumina, and sulphate of alumina may be introduced separately or together.

Any suitable apparatus may be used for carrying out my improvements.

What I claim as my invention is—

The method of purifying water consisting in introducing into it sodic chloride, alumina and sulphate of alumina, in sufficient quantities to precipitate the impurities, and afterward separating the impurities from the water.

In testimony whereof I have signed my name to this specification in the presence of two subscribing witnesses.

JOHN WILSON.

Witnesses:
H. COUTANT,
GEO. E. CRUSE.